United States Patent
Böcker et al.

(10) Patent No.: US 7,165,667 B2
(45) Date of Patent: Jan. 23, 2007

(54) BEVERAGE BOTTLING PLANT FOR FILLING BEVERAGE BOTTLES OR OTHER BEVERAGE CONTAINERS WITH A LIQUID BEVERAGE FILLING MATERIAL AND AN ARRANGEMENT FOR DIVIDING AND SEPARATING OF A STREAM OF BEVERAGE BOTTLES OR OTHER BEVERAGE CONTAINERS

(75) Inventors: Horst Böcker, Schwerte (DE); Berthold Paroth, Dortmund (DE); Ulrich Scholz, Lüdinghausen (DE)

(73) Assignee: KHS Maschinen - und Anlagenbau AG, Dortmund (DE)

( * ) Notice: Subject to any disclaimer, the term of this patent is extended or adjusted under 35 U.S.C. 154(b) by 0 days.

(21) Appl. No.: 10/723,451

(22) Filed: Nov. 26, 2003

(65) Prior Publication Data
US 2004/0168401 A1    Sep. 2, 2004

(30) Foreign Application Priority Data
Nov. 29, 2002   (DE) ............................... 102 55 814

(51) Int. Cl.
   *B65G 47/26* (2006.01)
   *B65B 5/00* (2006.01)
(52) U.S. Cl. ........................................ 198/442; 53/282
(58) Field of Classification Search .................. 198/442, 198/436; 53/282
   See application file for complete search history.

(56) References Cited
   U.S. PATENT DOCUMENTS
   2,265,261 A  * 12/1941  Bergmann ................. 198/442
   3,355,002 A  * 11/1967  Greck ....................... 198/442
   3,552,537 A  *  1/1971  Vamvakas .................. 198/442
   5,582,284 A  * 12/1996  Calladine et al. ........... 198/367
   5,638,938 A  *  6/1997  Lazzarotti et al. .......... 198/445
   6,334,525 B1 *  1/2002  Collins et al. .............. 198/442

FOREIGN PATENT DOCUMENTS
   DE   27 27 277          4/1979
   DE   44 35 199 A1       4/1996

* cited by examiner

Primary Examiner—Rinaldi I. Rada
   Assistant Examiner—John Paradiso
   (74) Attorney, Agent, or Firm—Nils H. Ljungman & Associates

(57) ABSTRACT

There is now provided a beverage bottling plant for filling beverage bottles or other beverage containers with a liquid beverage filling material and an arrangement for dividing and separating of a stream of beverage bottles or other beverage containers, which arrangement reduces noise, wear and toppling of containers. The abstract of the disclosure is submitted herewith as required by 37 C.F.R. §1.72(b). As stated in 37 C.F.R. §1.72(b), "A brief abstract of the technical disclosure in the specification must commence on a separate sheet, preferably following the claims, under the heading 'Abstract of the Disclosure.' The purpose of the abstract is to enable the Patent and Trademark Office and the public generally to determine quickly from a cursory inspection the nature and gist of the technical disclosure. The abstract shall not be used for interpreting the scope of the claims." Therefore, the abstract is not intended to limit the claims in any manner and should not be interpreted as limiting the claims in any manner.

7 Claims, 4 Drawing Sheets

BEVERAGE BOTTLING PLANT FOR FILLING BEVERAGE BOTTLES OR OTHER BEVERAGE CONTAINERS WITH A LIQUID BEVERAGE FILLING MATERIAL AND AN ARRANGEMENT FOR DIVIDING AND SEPARATING OF A STREAM OF BEVERAGE BOTTLES OR OTHER BEVERAGE CONTAINERS

BACKGROUND OF THE INVENTION

1. Field of the Invention

The present invention in one aspect relates to a beverage bottling plant for filling beverage bottles or other beverage containers with a liquid beverage filling material and an arrangement for dividing and separating of a stream of beverage bottles or other beverage containers.

2. Background Information

The individual production machines and/or stations within an entire installation or plant of the beverage industry (beverage containerization industry) are, as a rule, connected to one another by container conveyers that are configured and disposed to transport the containers to be treated, such as bottles, cans, or the like, in a predetermined flow.

It is oftentimes necessary during transport of the containers on these transport conveyers, to change the configuration of the stream of containers. Thus, for example, a multiple-file stream of containers that arises, for example, at the output end of a cleaning machine, is re-shaped into a single-file stream in order that this single-file stream can be passed, for example, to an inspection machine.

A further aim resides, for example, in the re-shaping of a single-file stream of containers into a multiple-file stream of containers, as may, for example, be required with the use of storage tables, or on the path of the containers from a labelling machine to a packer structure arrangement.

One problem that also needs to be addressed in the configuration of container transport conveyers is the separation of streams of containers to establish separated multiple-file streams, i.e., diverging streams of containers.

A separation of the streams of containers can be required, for example, in the event that a container stream from a high-production cleaning machine or cleaning station is to be divided or separated for a plurality of inspection machines or inspection stations or structures, that succeed the cleaning machine or cleaning station.

The following essentially only deals with the division of streams of containers into several diverging streams.

The main problems during the division or separation of the stream of containers, that may be present 'in bulk', into a plurality of streams include creation of noise, danger of toppling of containers, and the wear that is due to disadvantageous and careless treatment.

A number of suggestions have been made for the solution of this problem or aim.

Firstly, it is known to dispose guide elements that terminate with an acute tip in such a way in a stream of containers such that this stream flows onto guide elements, and the stream is divided into at least two partial streams of containers by these guide elements. Federal Republic of Germany Patent No. DE 2,727,277 of Seitz Werke GmbH, published on Jan. 4, 1979 may be mentioned at this point as an example among such numerous embodiments of this type. The disclosure of Federal Republic of Germany Patent No. DE 2,727,277 is hereby incorporated by references as if fully set forth in its entirety herein.

It is disadvantageous in such embodiments that the containers impact in un-decelerated manner at the guide elements. It is further also detrimental that the containers retain their initial path of movement and are given a new direction of movement only upon impacting at the guide element and/or other containers.

It is a particular detriment that in such embodiments there substantially always arises the problem that containers impact in a straight-line mode at the tip of the guide element. In such cases, the container is initially not guided to any of the partial streams. Rather, in such situations, there arise constantly disruptions of the continuous flow of containers and, last but not least, toppling of one or of several containers. These occurrences are highly undesirable during operation. Furthermore, the aforementioned processes cause high wear and considerable development of noise.

An application according to Federal Republic of Germany Patent No. DE 44 35 199 of Kronseder and issued on Apr. 4, 1996 has also become known. The disclosure of Federal Republic of Germany Patent No. DE 44 35 199 is hereby incorporated by references as if fully set forth in its entirety herein.

Within the scope of this suggestion by Kronseder, there is essentially proposed, for separation of a stream of containers, to dispose a guide element in the stream of containers, with a degree of improvement being obtained thereby that the containers that are introduced are guided in a particular manner to the separating location. For this, the containers are initially passed to a guide channel that has such a width such that the containers align themselves in a quasi two-file stream and with a certain lateral offset.

This aligning of the container avoids direct and straight-line impact of the containers at the tip of the guide element. However, the change of direction of movement of the containers is only effectuated upon impact of the containers at the guide element and/or other containers. The disadvantages described herein above, consequently, are also essentially present in this embodiment suggested by Kronseder.

OBJECTS OF THE INVENTION

One object of the present invention described below is to solve the problems encountered on similar apparatus of the prior art.

It is also the aim and objective of the present invention to provide for alleviation and improvement, such that development of noise, increased container wear, and disruptions of the flow of containers are substantially reduced.

SUMMARY OF THE INVENTION

The invention teaches in one aspect that the foregoing objects can be accomplished by a beverage bottling plant for filling bottles with a liquid beverage filling material, said beverage bottling plant comprising: a cleaning station configured and disposed to clean bottles; a first conveyer arrangement configured and disposed to convey bottles to said cleaning station; an inspection station configured and disposed to inspect cleaned bottles; said inspection station comprising at least a first inspection structure and a second inspection structure separate from said first inspection structure; a second conveyer arrangement configured and disposed to convey cleaned bottles from said cleaning station to said inspection station; said second conveyer arrangement comprising at least a first set of conveyer band structures and a second set of conveyer band structures; at least a portion of said first set of conveyer band structures comprising at least one straight conveyer band; which at least one straight conveyer band has at least one straight portion; at least a portion of said second set of conveyer band structures comprising at least one straight conveyer band; which at least one straight conveyer band has at least one straight portion; at least a portion of said first set of conveyer band structures and at least a portion of said second set of conveyer band structures being disposed at an angle with respect to one another; said angle and said at least first and second set of conveyer band structures together being configured and disposed with respect to one another to separate a first stream of cleaned bottles into at least two streams of cleaned bottles to permit conveying of a second stream of cleaned bottles, narrower than a first stream of cleaned bottles, to said first inspection structure and also to permit conveying of a second stream of cleaned bottles, narrower than a first stream of cleaned bottles, to said second inspection structure; a guide structure disposed adjacent said first and second sets of conveyer band structures and configured to guide a second stream of cleaned bottles to a first inspection structure and a third stream of cleaned bottles to a second inspection structure; a filling machine configured to fill cleaned and inspected bottles with liquid beverage filling material; said beverage filling machine comprising a plurality of beverage filling positions, each beverage filling position comprising a beverage filling device for filling bottles with liquid beverage filling material; said filling devices comprising apparatus configured to introduce a predetermined flow of liquid beverage filling material into the interior of bottles to a substantially predetermined level of liquid beverage filling material; said apparatus configured to introduce a predetermined flow of liquid beverage filling material comprising apparatus configured to terminate the filling of beverage bottles upon liquid beverage filling material reaching said substantially predetermined level in bottles; a third conveyer arrangement configured and disposed to move inspected bottles from said inspection machine to said filling machine; a closing station configured to close filled bottles; and a fourth conveyer arrangement configured and disposed to transfer filled bottles from said filling machine to said closing station.

The invention further teaches that the foregoing objects can be accomplished by a container filling plant conveyer arrangement configured to transport containers, such as bottles and cans, said conveyer arrangement comprising: an input being configured and disposed to receive an input stream of containers being a plurality of containers wide; a first output being configured and disposed to discharge a first output stream of containers narrower than the input stream of containers; a second output being configured and disposed to discharge a second output stream of containers narrower than the input stream of containers; a first conveyer belt structure and a second conveyer belt structure; said first conveyer belt structure being configured and disposed to receive a portion of the input stream of containers from said input and being configured and disposed to discharge the first output stream of containers, narrower than the input stream of containers, to said first output; said second belt conveyer structure being configured and disposed to receive a portion of the input stream of containers from said input and being configured and disposed to discharge the second output stream of containers, narrower than the input stream of containers, to said second output; said first conveyer belt structure and said second conveyer belt structure together being configured and disposed in a physical relation with respect to one another to separate the input stream of containers into the first output stream of containers and into the second output stream of containers in m of containers; and a guide structure being configured and disposed to guide the first output stream of containers to said first output and the second output stream of containers to said second output.

The invention also teaches that the foregoing objects can be accomplished by a container filling plant conveyer arrangement configured to transport containers, such as bottles and cans, said conveyer arrangement comprising: an input being configured and disposed to receive an input stream of containers; a first output being configured and disposed to discharge a first output stream of containers; a second output being configured and disposed to discharge a second output stream of containers; a first conveyer structure and a second conveyer structure; said first conveyer structure being configured and disposed to receive a portion of the input stream of containers from said input and being configured and disposed to discharge the first output stream of containers to said first output; said second conveyer structure being configured and disposed to receive a portion of the input stream of containers from said input and being configured and disposed to discharge the second output stream of containers to said second output; said first conveyer structure and said second conveyer structure together being configured and disposed in a physical relation with respect to one another to separate the input stream of containers into the first output stream of containers and into the second output stream of containers; and a guide structure being configured and disposed to guide the first output stream of containers to said first output and the second output stream of containers to said second output.

For this, the present invention teaches in one aspect that the customary transport bands or belts or like structures of transport conveyers are guided, within the separation process, in such a way that they separate and distribute the stream of containers already anteriorly with respect to a guide element that is disposed in a stream of containers.

The above-discussed embodiments of the present invention will be described further herein below. When the word "invention" is used in this specification, the word "invention" includes "inventions", that is the plural of "invention", By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the embodiments which are described and illustrated in the accompanying drawings.

DESCRIPTION OF THE PREFERRED EMBODIMENTS

Figure 1:
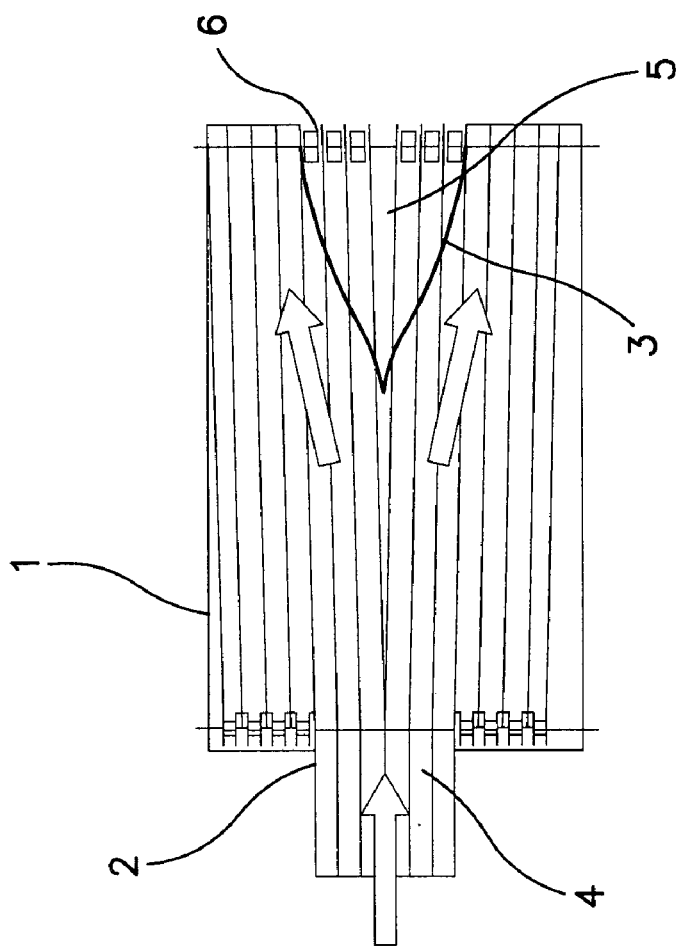
FIG. 1 is a top plan view of a separating guide arrangement in accordance with at least one possible embodiment of the present invention.

As is illustrated in FIG. 1, the separating guide arrangement, firstly, comprises a known conveyer frame 1 that comprises a container input end 2 and a guide element 3.

Because a separating guide arrangement may be part of associated overriding plant components, such as, for example, storage tables, or sorting apparatus, the further structural configuration possibilities of the separation upon division of the stream of the containers or, respectively, at the end of the guide element, are not discussed in detail at this point.

In one embodiment of the invention it is contemplated that the containers are introduced by at least two input bands or belts or the like conveying equipment that are identified by reference numeral 4 to the separating guide arrangement. In other embodiments, any desired number of bands such as bands 4 may be employed.

So as to carry out the division of the stream of containers at the guide element 3 that is disposed within the stream of containers in a most favorable manner, in at least one possible embodiment of the present invention it is suggested to guide the input bands 4 on their path from the container input end 2 to the guide element 3 in a manner such that they diverge from one another at a predetermined angle. This means that, since the containers that are transported by the input bands 4 follow the direction of travel of the input bands 4, the stream of containers is divided into two partial streams, with a wedge-shaped gap forming between such two partial streams or double-file or double-row or double-track arrangement, it being understood that each track may possibly comprise a number of rows. Simultaneously, the containers are given, due to the horizontally skewed positioning of the input bands 4, a change of course, such that they impact with a favorable angle at the guide element 3. The gap that is produced in the stream of containers is positively preventing the containers from impacting at the tip of the guide element 3.

In accordance with one aspect of the invention, suitable means or structures close the gap that is produced by the diverging movement of the input bands 4 at the upper surface of the separating guide arrangement. As is shown in FIG. 1, for example, such means may be a sheet metal slide structure 5; however, also other known components or structures can be employed. The upper surfaces of the sheet metal slide structure 5 and of the input bands 4 of the separating guide arrangement are to be disposed in the same plane.

It has been found particularly advantageous in practical use that the magnitude of the angle at which the input bands 4 are diverging is selected in such a way that the width of the sheet metal slide structure 5 is smaller adjacent the tip of the guide element 3 than the size of the base surface of the containers that are being conveyed. This design embodiment ensures that the containers will substantially not accumulate on the sheet metal slide structure 5, but rather a secure exit of the containers is assured.

Investigations have shown that with angles of the input bands 4 of up to 1.5 degrees with respect to one another, standard conveyer chains that are configured for movement in a straight line can be used. In case of an angle that is greater that 1.5 degrees, use of chains that are capable of movement in curvilinear directions is advantageous.

It will be appreciated that by simple experimentation a suitable angle may be determined. Thus, the angle of separation mentioned may be less than 1.5 degrees, and the angles of less than 1.5 degrees are included, in increments of one tenths of degree, or smaller fractions of a degree. In at least one embodiment, the angle may be greater than 1.5 degrees, in increments of one tenths of a degree or less in the case that chains are used that are capable of movement in a curvilinear direction.

So as to prevent, in the case of elevated transport band velocities, flapping and/or lifting of the conveyer bands from their respective guides, it is possible, in such cases, to utilize magnetic conveyer bands, since such bands are held more positively in their guides due to force of gravity and due to magnetic force of attraction.

In a particularly preferred embodiment of the present invention, a turn station 6 can be provided within the separating guide arrangement, to provide for turning and for an improved guiding and maintaining the distance between the input bands 4. It is highly useful to select the geometric dimensions in such a way that the input bands 4, due to their skewed orientation within the turn station, have such a distance of separation that is exactly equal to the width of an input band 4. In further embodiments, however, other distances may be utilized, with distances measuring in whole numbers being particularly advantageous.

In the following with reference to FIG. 1A, this Figure generally illustrates a bottling plant with a rinser 101 or cleaning station to which the containers, namely bottles B, are fed in the direction indicated by the arrow Al by means of a conveyer line 103, and downstream of which, in the direction of travel, the rinsed bottles B are transported by means of a conveyer line 104 formed by a star-wheel conveyer to a filling machine 105 or its inlet star-wheel conveyer. Downstream of the filling machine 105, in the direction of travel of the bottles B, there can preferably be a closer 106 which closes the bottles B. The closer 106 can be connected directly to a labelling device or station 108 by means of a conveyer line 107 formed by a plurality of star-wheel conveyers. In the illustrated embodiment, the labelling device 108 has three outputs: one output formed by a conveyer 109 for bottles B which are filled with a first product from product mixer 123 through conduit 121, and are then labelled according to the first product; a second output formed by a conveyer 110 for those bottles B which are filled with a second product from product mixer 124 through conduit 122 and are then labelled according to the second product; and a third output formed by a conveyer 111 which removes any bottles B which have been incorrectly labelled.

Figure 1A:
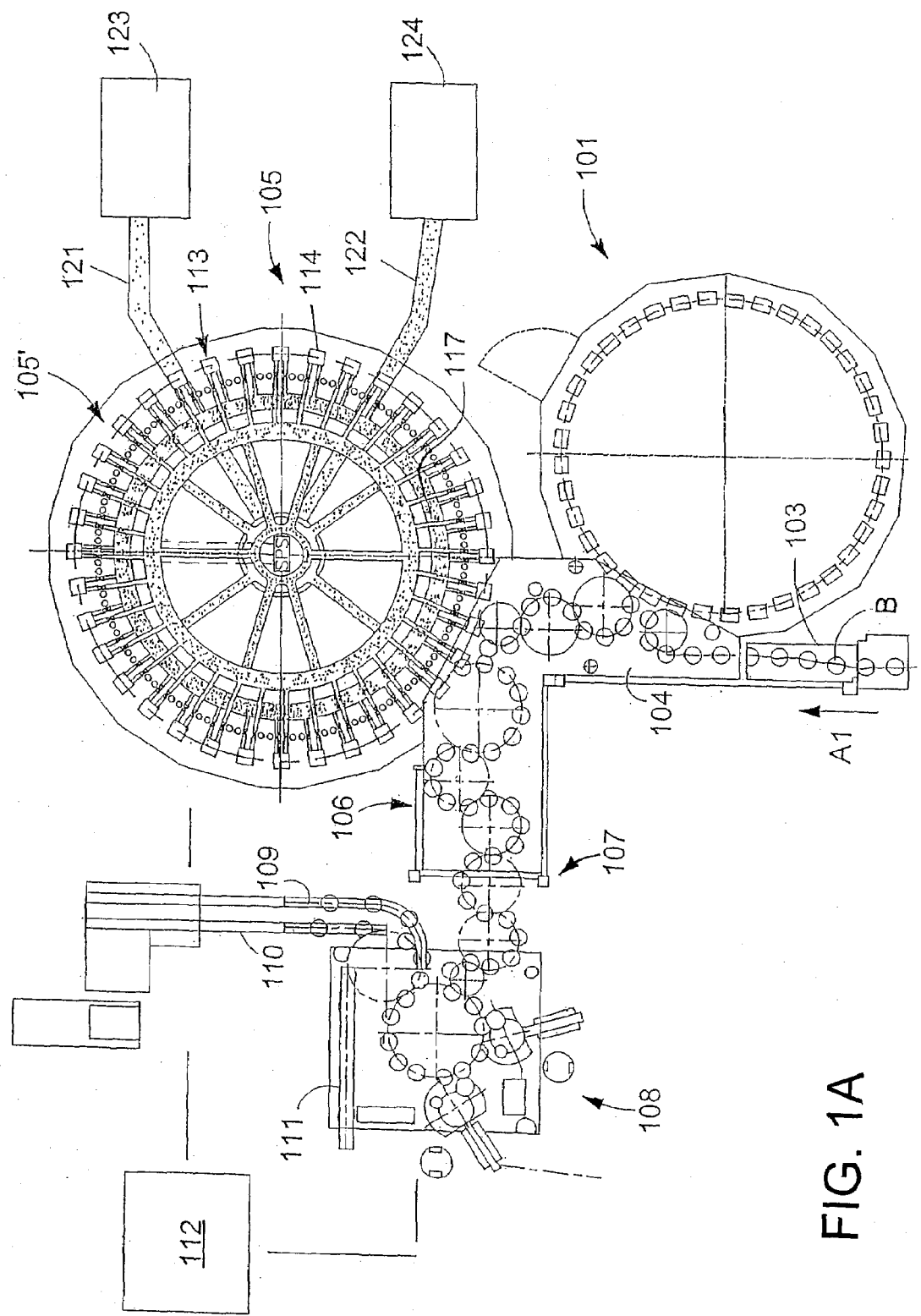
FIG. 1A is a schematic illustration of a container filling plant in accordance with at least one possible embodiment of the present invention.

In FIG. 1A, 112 is a central control unit or, expressed differently, controller or system which includes a process controller which, among other things, controls the operation of the above-referenced system.

The filling machine 105 is possibly of the revolving design, with a rotor 105' which revolves around a vertical machine axis. On the periphery of the rotor 105' there are a number of filling positions 113, each of which comprises bottle carriers or container carriers, as well as a filling element or filling device 114 located above the corresponding container carrier. The toroidal vessel 117 is a component of the revolving rotor 105'. The toroidal vessel 117 can be connected by means of a rotary coupling and by means of the conduit or external connecting line 121 to the product mixer or external reservoir or mixer 123 to supply the product, that is, product mix from reservoir 123, for example.

As well as the more typical filling machines having one toroidal vessel, it is possible that in at least one possible embodiment of the present invention, a filling machine could possibly be utilized wherein each filling element or filling device 114 is preferably connected by means of two connections to the toroidal vessel 117 which contains the first product (by means of a first connection, for example, 121) and to a second toroidal vessel which contains the second product (by means of the second connection, for example, 122). In this case, each filling element 114 can also preferably have, at the connections, two individually-controllable fluid or control valves, so that in each bottle B which is delivered at the inlet of the filling machine 105 to a filling position 113, the first product or the second product can be filled by means of an appropriate control of the filling product or fluid valves.

It will be understood that while a two-product assembly is illustrated in FIG. 1A, that the invention is equally applicable to single-product installations, or other commensurate embodiments.

Figure 2:
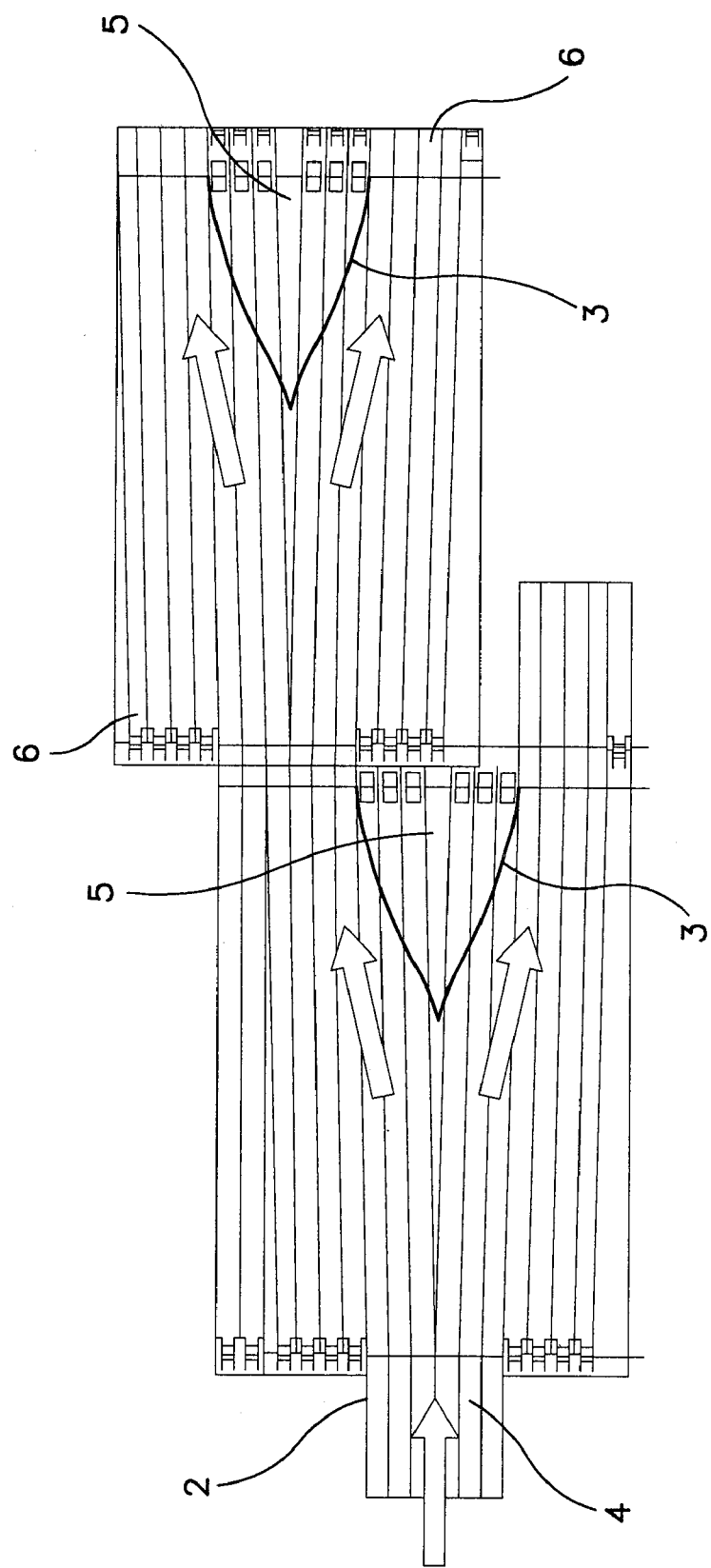
FIG. 2 is a top plan view of a multiple-file separating guide in accordance with at least one possible embodiment of the invention.

In further separate embodiments of the present invention, there may be provided that a plurality of two or more separating guide arrangements, in accordance with one aspect of the present invention, are utilized, these being disposed in succession with respect to one another. A corresponding embodiment example is illustrated in FIG. 2.

When several separating guide arrangements are disposed in sequence, one after the other, numerous combinations of design embodiments result.

For example, there can be disposed further separating guide arrangements that follow the first separating guide arrangement, on both sides or, equally, only on one side of this first separating guide arrangement, such that the streams of containers are divided according to the operational requirements, and such that they can be further transported in downstream direction.

Such configurations achieve a plurality of divisions of the stream of containers in a particularly advantageous manner, with the space requirements and the financial expenditures of such an arrangement being particularly low.

Application of a separating guide arrangement, in accordance with one aspect of the present invention, is in container filling plants, for example, at storage tables. The separating guide arrangement it is also used in the division of streams of containers anteriorly of container treatment machines or stations, such as, for example, inspection machines or packaging machines.

Figure 3:
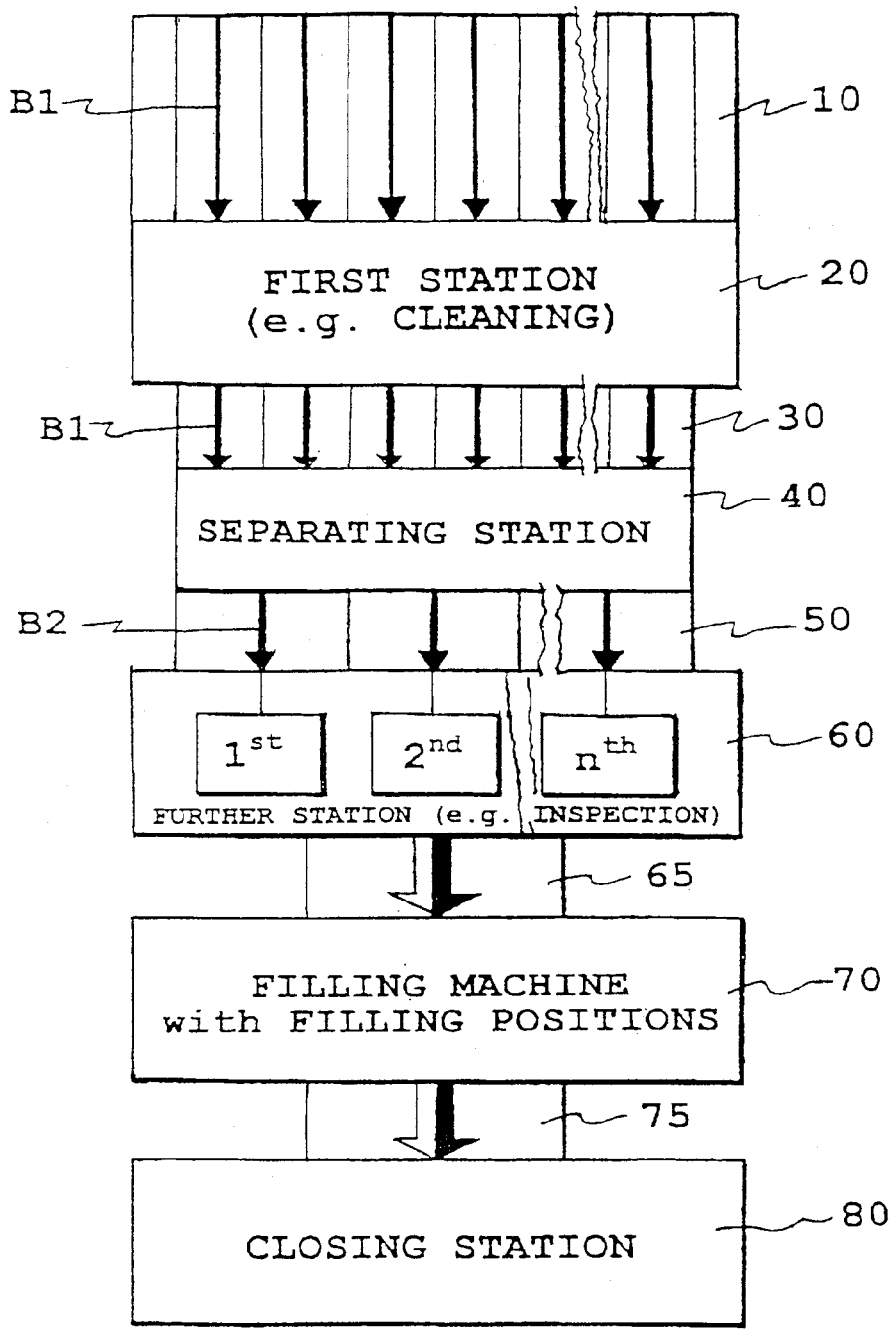
FIG. 3 is a block diagram illustrating the arrangement of a separating guide arrangement with respect to cleaning, inspection, filling and closing equipment in a container filling plant in accordance with at least one possible embodiment of the present invention.

FIG. 3 is a block diagram illustrating the arrangement of a separating guide arrangement with respect to cleaning, inspection, filling and closing equipment in a container filling plant. In this embodiment, a first conveyer arrangement 10 transports bottles in a first stream B1, which may possibly be a plurality of bottles wide. The bottles are passed to a first station, such as a cleaning station 20 for cleaning. A second conveyer arrangement 30 transports the bottles to a separating guide arrangement 40 that is configured and disposed to separate the stream into two streams, or a plurality of more streams B2. A third conveyer arrangement 50 passes the respective streams B2 to a further treatment station, such as an inspection station 60, with one or more individual inspection structures, such as a plurality of inspection structures. A fourth conveyer arrangement 65 transports the bottles to a filling machine 70 having a plurality of filling positions and filling devices. A fifth conveyer arrangement 75 transports the filled bottles to a closing station 80 for closing. It will be appreciated that the separating guide arrangement may be correspondingly employed with other stations that require the separation of a stream of containers into two streams of containers or more than two streams of containers.

One feature of the invention resides broadly in an arrangement for separating and dividing streams of containers with at least one container input end 2, at least two input bands 4, and at least one guide element 3 that is disposed within the stream of containers, characterized by the fact that the conveyer bands comprise conveyer bands that are customary in transport conveyers, and the conveyer bands are guided in such a way that they produce a diverging and divided stream of containers.

Another feature of the invention resides broadly in an arrangement characterized therein that the divergence of streams or, respectively, the division of the stream of containers is carried out anteriorly of a guide element 3 that is disposed within a stream of containers.

Yet another feature of the invention resides broadly in an arrangement characterized therein that the input bands 4 are guided in such a way that these bands form at least two groups that are disposed at an angle with respect to one another, such that the input bands 4 anteriorly of the tip of the guide element 3 are disposed at a distance with respect to one another.

Still another feature of the invention resides broadly in an arrangement characterized therein that the gap that results between the input bands 4 is covered by at least one sheet metal slide structure 5.

A further feature of the invention resides broadly in an arrangement characterized therein that within the separating guide arrangement there is disposed a turn station 6.

Another feature of the invention resides broadly in an arrangement characterized therein that the separating guide arrangement comprises a plurality of stages.

It will be appreciated that a number of options are available in terms of conveying arrangements by the conveyer structures. Thus, in general terms, the invention comprises in at least one aspect the receipt of containers 'in bulk' or random arrangement, with provision being made to arrange such containers that are present 'in bulk' in an orderly pattern of streams. For example, in one embodiment containers present 'in bulk' may be separated into two orderly streams. It will be appreciated that each stream may comprise a single-file, a double-file and so forth arrangement of containers. It will also be appreciated that a double-file stream may be separated into two single-file streams by an arrangement in accordance with the present invention.

The turn station 6 in one possible embodiment of the present invention may comprise a structure or arrangement to reverse the course of the flight of the band or belt from an upper, container-carrying position into a lower, belt or band returning condition. In yet another embodiment of the present invention the turn station 6 may comprise a structure or arrangement to change the course of direction of the containers at the output end of the separating conveyer arrangement.

The components disclosed in the various publications, disclosed or incorporated by reference herein, may be used in the embodiments of the present invention, as well as equivalents thereof.

Some examples of conveyer arrangements or conveyer apparatus, features of which may possibly be used or adapted for use in at least one possible embodiment, may be found in the following U.S. Pat. Nos. 3,552,537; 3,953,076; 4,054,199; 4,308,944; 4,489,820; 4,496,040; 4,708,234; 4,839,067; 4,880,103; 5,143,204; 5,284,238; 5,368,151; 5,388,682; 5,415,274; 6,109,425; 6131,724; and 6,634,487.

The appended drawings in their entirety, including all dimensions, proportions and/or shapes in at least one embodiment of the invention, are accurate and are hereby included by reference into this specification.

The European Patent Application No. EP 0 626 327 A1 published on Nov. 30, 1994 and naming Heinz-Jürgen Scherer as inventor and KHS Maschinen- und Anlagenbau Aktiengesellschaft as Applicant and having the title "Apparatus for converting a narrow single-track stream of containers into a broad stream of containers," is incorporated by reference herein as if set forth in its entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

Some examples of container conveying arrangements, features of which may possibly be used or adapted for use in at least one possible embodiment of the present invention may be found in the following foreign patent applications: German Patent Publication No. DOS 30 02 802 A1; GB Patent Application No. 2,128,954; European Patent Application No. 0 183 309; and GB Patent Application No. 2,199,296.

All or substantially all, of the components and methods of the various embodiments may be used with at least one embodiment or all of the embodiments, if more than one embodiment is described herein.

Some examples of bottling systems, which may be used or adapted for use in at least one possible embodiment of the present may be found in the following U.S. Patents assigned to the Assignee herein, namely: U.S. Pat. Nos. 4,911,285; 4,944,830; 4,950,350; 4,976,803; 4,981,547; 5,004,518; 5,017,261; 5,062,917; 5,062,918; 5,075,123; 5,078,826; 5,087,317; 5,110,402; 5,129,984; 5,167,755; 5,174,851; 5,185,053; 5,217,538; 5,227,005; 5,413,153; 5,558,138; 5,634,500; 5,713,403; 6,276,113; 6,213,169; 6,189,578; 6,192,946; 6,374,575; 6,365,054; 6,619,016; 6,474,368; 6,494,238; 6,470,922; and 6,463,964.

The details in the patents, patent applications and publications may be considered to be incorporable, at Applicant's option, into the claims during prosecution as further limitations in the claims to patentably distinguish any amended claims from any applied prior art.

Some examples of methods and apparatuses for closing bottles and containers and their components which may possibly be used or adapted for use in at least one possible embodiment of the present invention may be found in the following U.S. Pat. Nos. 5,398,485; 5,402,623; 5,419,094; 5,425,402; 5,447,246; and 5,449,080.

The abstract of the disclosure is submitted herewith as required by 37 C.F.R. §1.72(b). As stated in 37 C.F.R. §1.72(b): "A brief abstract of the technical disclosure in the specification must commence on a separate sheet, preferably following the claims, under the heading 'Abstract of the Disclosure.' The purpose of the abstract is to enable the Patent and Trademark Office and the public generally to determine quickly from a cursory inspection the nature and gist of the technical disclosure. The abstract shall not be used for interpreting the scope of the claims." Therefore, the abstract is not intended to limit the claims in any manner and should not be interpreted as limiting the claims in any manner.

Some examples of filling machines that utilize electronic control devices to control various portions of a filling or bottling process and which may possibly be utilized in connection with the present invention may be found in the following U.S. Pat. Nos. 4,821,921; 5,056,511; 5,273,082; and 5,301,488.

The invention as described hereinabove in the context of the preferred embodiments is not to be taken as limited to all of the provided details thereof, since modifications and variations thereof may be made without departing from the spirit and scope of the invention.

The corresponding foreign patent publication applications, namely, Federal Republic of Germany Patent Application No.102 55 814.0, filed on Nov. 29, 2002, having inventors Horst BÖCKER, Berthold PAROTH, and Ulrich SCHOLZ, and DE-OS 102 55 814.0, having inventors Horst BÖCKER, Berthold PAROTH, and Ulrich SCHOLZ, and DE-PS 102 55 814.0, having inventors Horst BÖCKER, Berthold PAROTH, and Ulrich SCHOLZ, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the patents, patent applications and publications recited herein, and in the Declaration attached hereto, and the references recited in such patents, patent applications and publications that are recited herein and in the Declaration attached hereto, are hereby incorporated by reference as if set forth in their entirety herein.

Some examples of microcomputer control systems which may possibly be incorporated in an embodiment of the present invention may be found in the following U.S. Pat. Nos. 5,530,515; 5,548,774; 5,581,771; 5,610,749; 5,619,669; 5,664,199; and 5,687,345. All of the foregoing U.S. patents are hereby incorporated by reference as if set forth in their entirety herein.

It will be understood that the examples of patents, published patent applications, and other documents which are included in this application and which are referred to in paragraphs which state "Some examples of . . . which may possibly be used in at least one possible embodiment of the present invention . . ." may possibly not be used or useable in anyone or more embodiment of the invention.

The invention as described hereinabove in the context of the preferred embodiments is not to be taken as limited to all of the provided details thereof, since modifications and variations thereof may be made without departing from the spirit and scope of the invention.

What is claimed is:

1. A container filling plant conveyer arrangement configured to transport containers, such as bottles and cans, said conveyer arrangement comprising:

an input being configured and disposed to receive an input stream of containers;

a first output being configured and disposed to discharge a first output stream of containers;

a second output being configured and disposed to discharge a second output stream of containers;

a first conveyer belt and a second conveyer belt;

said first conveyer belt being configured and disposed to receive a portion of the input stream of containers from said input and being configured and disposed to discharge the first output stream of containers to said first output;

said second conveyer belt being configured and disposed to receive a portion of the input stream of containers from said input and being configured and disposed to discharge the second output stream of containers to said second output;

said first conveyer belt and said second conveyer belt together being configured and disposed in a physical relation with respect to one another to separate the input stream of containers into the first output stream of containers and into the second output stream of containers;

a guide structure being configured and disposed to guide the first output stream of containers to said first output and the second output stream of containers to said second output;

said first conveyer belt comprises a first portion disposed adjacent said input configured to receive an input stream of containers and a second portion disposed adjacent said first output being configured to discharge a first output stream of containers;

said second conveyer belt comprises a first portion disposed adjacent said input configured to receive an input stream of containers and a second portion disposed adjacent said second output being configured to discharge a second output stream of containers;

said second portion of said first conveyer belt and said second portion of said second conveyer belt being disposed to diverge from one another at a point of divergence;

said guide structure is disposed between said point of divergence and said first and second outputs to permit separation of the first stream of containers into the first output stream of containers and into the second output stream of containers;

said guide structure comprises a tip portion;

said second portion of said first conveyer belt and said second portion of said second conveyer belt are disposed at an angle with respect to one another to separate the first output stream of containers from the second output stream of containers; and said second portion of said first conveyer belt and said second portion of said second conveyer belt diverge from one another anteriorly of said tip portion of said guide structure.

2. The container filling plant conveyer arrangement according to claim 1, comprising:
at least one sheet metal surface structure;
said at least one sheet metal surface structure is disposed adjacent said point of divergence to permit separation of the first output stream of containers and the second output stream of containers; and
said at least one sheet metal surface structure is configured to cover at least a portion of the space between said first conveyer belt and said second conveyer belt and to permit sliding of containers thereon.

3. The container filling plant conveyer arrangement according to claim 2, wherein: said first conveyer belt comprises a first band conveyer; and
said second conveyer belt comprises a second band conveyer;
and the container filling plant conveyer arrangement further comprising:
a turn station configured and disposed to effectuate at least one of (i) and (ii), wherein (i) and (ii) comprise:
(i) turning of a conveyer band of a band conveyer; and
(ii) turning of the direction of movement of containers on a band conveyer.

4. The container filling plant conveyer arrangement according to claim 3, comprising:
a third conveyer belt and a fourth conveyer belt together being configured and disposed to receive containers from said first output and to separate containers from said first output into a third output stream of containers and a fourth output stream of containers.

5. The container filling plant conveyer arrangement according to claim 3, comprising:
a third conveyer belt and a fourth conveyer belt together being configured and disposed to receive containers from said first output and to separate containers from said first output into a third output stream of containers and a fourth output stream of containers.

6. The container filling plant conveyer arrangement according to claim 5, wherein:
said angle comprises approximately 1.5 degrees.

7. The container filling plant conveyer arrangement according to claim 1, comprising at least one of (c), (d), (e), (f), and (g), wherein (c), (d), (e), (f), and (g) comprise:
(c) at least one sheet metal surface structure;
said at least one sheet metal surface structure is disposed adjacent said point of divergence to permit separation of the first output stream of containers and the second output stream of containers; and
said at least one sheet metal surface structure is configured to cover at least a portion of the space between said first conveyer belt and said second conveyer belt and to permit sliding of containers thereon;
(d) said first conveyer belt comprises a first band conveyer; and
said second conveyer belt comprises a second band conveyer;
and the container filling plant conveyer arrangement further comprising:
a turn station configured and disposed to effectuate at least one of (i) and (ii), wherein (i) and (ii) comprise:
(i) turning of a conveyer band of a band conveyer; and
(ii) turning of the direction of movement of containers on a band conveyer;
(e) a third conveyer belt and a fourth conveyer belt together being configured and disposed to receive containers from said first output and to separate containers from said first output into a third output stream of containers and a fourth output stream of containers;
(f) said first conveyer belt and said second conveyer belt comprise one of (i) and (ii), wherein (i) and (ii) comprise:
(i) a belt conveyer belt; and
(ii) a chain conveyer belt; and
(g) said second portion of said first conveyer belt and said second portion of said second conveyer belt are disposed at an angle with respect to one another to separate the first output stream of containers from the second output stream of containers;
said angle comprises approximately 1.5 degrees.

* * * * *